United States Patent
Zhao et al.

(10) Patent No.: US 11,097,470 B2
(45) Date of Patent: Aug. 24, 2021

(54) LASER 3D PRINTING METHOD AND SYSTEM THEREOF WITH ORTHOPEDIC FUNCTION

(71) Applicants: Inno Laser Technology Corporation Limited, Guangdong (CN); Jiangsu Weina Laser Application Technology Research Institute Co., Ltd., Jiangsu (CN)

(72) Inventors: Xiaojie Zhao, Ronkonkoma, NY (US); Sha Tao, Guangdong (CN)

(73) Assignees: Inno Laser Technology Corporation Limited, Shenzhen (CN); Jiangsu Weina Laser Application Technology Research Institute Co., Ltd., Changzhou (CN)

( * ) Notice: Subject to any disclaimer, the term of this patent is extended or adjusted under 35 U.S.C. 154(b) by 356 days.

(21) Appl. No.: 16/236,497

(22) Filed: Dec. 29, 2018

(65) Prior Publication Data
US 2019/0152138 A1    May 23, 2019

Related U.S. Application Data

(63) Continuation of application No. PCT/CN2017/106246, filed on Oct. 16, 2017.

(30) Foreign Application Priority Data
Aug. 9, 2017   (CN) .................... 201710676679.X

(51) Int. Cl.
*B33Y 50/02*    (2015.01)
*B29C 64/393*    (2017.01)
(Continued)

(52) U.S. Cl.
CPC .......... *B29C 64/153* (2017.08); *B29C 64/264* (2017.08); *B29C 64/35* (2017.08);
(Continued)

(58) Field of Classification Search
CPC ..... B29C 64/153; B29C 64/264; B29C 64/35; B29C 64/393; B33Y 10/00; B33Y 30/00; B33Y 40/00; B33Y 50/02
See application file for complete search history.

(56) References Cited

U.S. PATENT DOCUMENTS

| | | | |
|---|---|---|---|
| 2006/0215246 A1* | 9/2006 | Kerekes | ............... B29C 64/135 359/201.1 |
| 2016/0202043 A1* | 7/2016 | Snis | ......................... G01P 3/36 250/340 |
| 2017/0304946 A1* | 10/2017 | Shibazaki | ............... B22F 10/00 |

FOREIGN PATENT DOCUMENTS

| CN | 104923606 A | * | 9/2015 |
|---|---|---|---|
| CN | 104923606 A | | 9/2015 |

(Continued)

*Primary Examiner* — Yuhui R Pan

(57) ABSTRACT

A laser 3D printing method with orthopedic function, comprising the following steps: step one, measuring a projection characteristic of each spot within a scanning plane, to obtain a deformation quantity of a focused light spot at the each spot within the scanning plane before rectifying; step two, setting compensation quantities of the each spot within the scanning plane of a light spot orthopedic device according to the measuring result of the step one, so that the size of the focused light spot at the each spot within the scanning plane is consistent; step three, turning on the laser, and dynamically matching the light spot orthopedic device and a scanning device to perform the laser 3D printing. The laser 3D printing method and system thereof with orthopedic function could ensure the size of the focused light spot is consistent within the scanning plane, thereby ensuring the quality of 3D printing.

5 Claims, 3 Drawing Sheets

(51) Int. Cl.
*B29C 64/153* (2017.01)
*B33Y 10/00* (2015.01)
*B33Y 30/00* (2015.01)
*B29C 64/35* (2017.01)
*B29C 64/264* (2017.01)
*B33Y 40/00* (2020.01)

(52) U.S. Cl.
CPC ............ *B29C 64/393* (2017.08); *B33Y 10/00* (2014.12); *B33Y 30/00* (2014.12); *B33Y 40/00* (2014.12); *B33Y 50/02* (2014.12)

(56) References Cited

FOREIGN PATENT DOCUMENTS

| CN | 105945284 A | * | 9/2016 |
|----|-------------|---|--------|
| CN | 105945284 A |   | 9/2016 |

* cited by examiner

LASER 3D PRINTING METHOD AND SYSTEM THEREOF WITH ORTHOPEDIC FUNCTION

CROSS REFERENCE TO RELATED APPLICATION

The present application is a Continuation Application of PCT Application No. PCT/CN2017/106246 filed on Oct. 16, 2017, which claims the benefit of Chinese Patent Application No. 201710676679.X filed on Aug. 9, 2017. All the above are hereby incorporated by reference.

FIELD OF THE INVENTION

The present application relates to the technical field of 3D printing, and more particularly, to a laser 3D printing method and system thereof with orthopedic function.

BACKGROUND OF THE INVENTION 3D printing technology is a technology of constructing object by using adhesive material such powder or plastic and layer-by-layer printing based on digital model files. It could produce parts of any shape directly from computer graphics data without needing machining or any mold, which greatly reduces a product development cycle and improves productivity and reduces production cost.

Laser sintering technology adopts the principle that powder material is sintered under laser irradiation and is formed layer-by-layer under control of a computer. Laser sintering technology could use a lot of powder materials to produce finished product of corresponding material. The finished product produced by laser sintering has good precision and high intensity, and the intensity of the final finished product is far superior to other 3D printing technologies. However, in Laser 3D technology, when the laser beam scans for large format 3D printing, the size of the focused light spot is usually not constant within the scanning plane, and the inconsistency of the size of the light spot will affect the quality of 3D printing, so ensuring that the size of the focused light spot is consistent within the scanning plane is especially important for 3D printing.

SUMMARY OF THE INVENTION

The embodiments of the present application provide a laser 3D printing method and system thereof with orthopedic function, which could solve the technical problem of light spot consistency in the 3D printing process of prior art.

A technical solution provided by the embodiments of the present application is:

A laser 3D printing method with orthopedic function, comprises the following steps:

Step one, measuring a projection characteristic of each spot within a scanning plane, to obtain a deformation quantity of a focused light spot at the each spot within the scanning plane before rectifying;

Step two, setting compensation quantities of the each spot within the scanning plane of a light spot orthopedic device according to the measuring result of the step one, so that the size of the focused light spot at the each spot within the scanning plane is consistent;

Step three, turning on the laser, and dynamically matching the light spot orthopedic device and a scanning device to perform the laser 3D printing.

Further, after the step three, the method further comprises:

Step four, performing 3D sintering to powder by using a continuous laser or a pulse laser;

Step five, performing laser-induced shock wave impact to a 3D sintered component by using a short pulse width laser; wherein the short pulse width refers to a pulse width of less than 100 ns;

Step six, polishing the 3D sintered component obtained after the step five by using a continuous laser or a pulse laser.

A system for realizing the laser 3D printing method with orthopedic function described above, comprising: an industrial personal computer; a laser having an adjustable pulse width and connected to and controlled by the industrial personal computer, a beam expanding device, a light spot orthodontic device, and a vibrating mirror and lens assembly; and a powder box connected to and controlled by the industrial personal computer and receiving a scan of the vibrating mirror and lens assembly for 3D printing of a workpiece.

Wherein, the light spot orthodontic device comprises a pair of cylindrical lenses which could rotate and shift relative to each other.

Wherein, the light spot orthodontic device comprises a cylindrical lens and an imaging system located behind the cylindrical lens, and the cylindrical lens could rotate and shift relative to the imaging system.

Wherein, the imaging system comprises a pair of lenses.

Wherein, the powder box is further connected to a powder supply device.

Wherein, the system further comprises a powder cleaning device connected to the powder box and a powder collecting device connected to the powder cleaning device.

Compared with the prior art, the embodiments of the present application could ensure that the size of the focused light spot is consistent within the scanning plane by precisely controlling the compensation quantity of the light spot orthopedic device, thereby ensuring the quality of 3D printing. Meanwhile, in the 3D printing process, by controlling the degree of laser sintering by changing the width of the laser pulse, the occurrence of holes, over-burning and spheroidization phenomenon in the printing process is improved, and the density is increased.

DESCRIPTION OF THE EMBODIMENTS

The present application will be further described in detail below with reference to the accompanying drawings.

Figure 1:
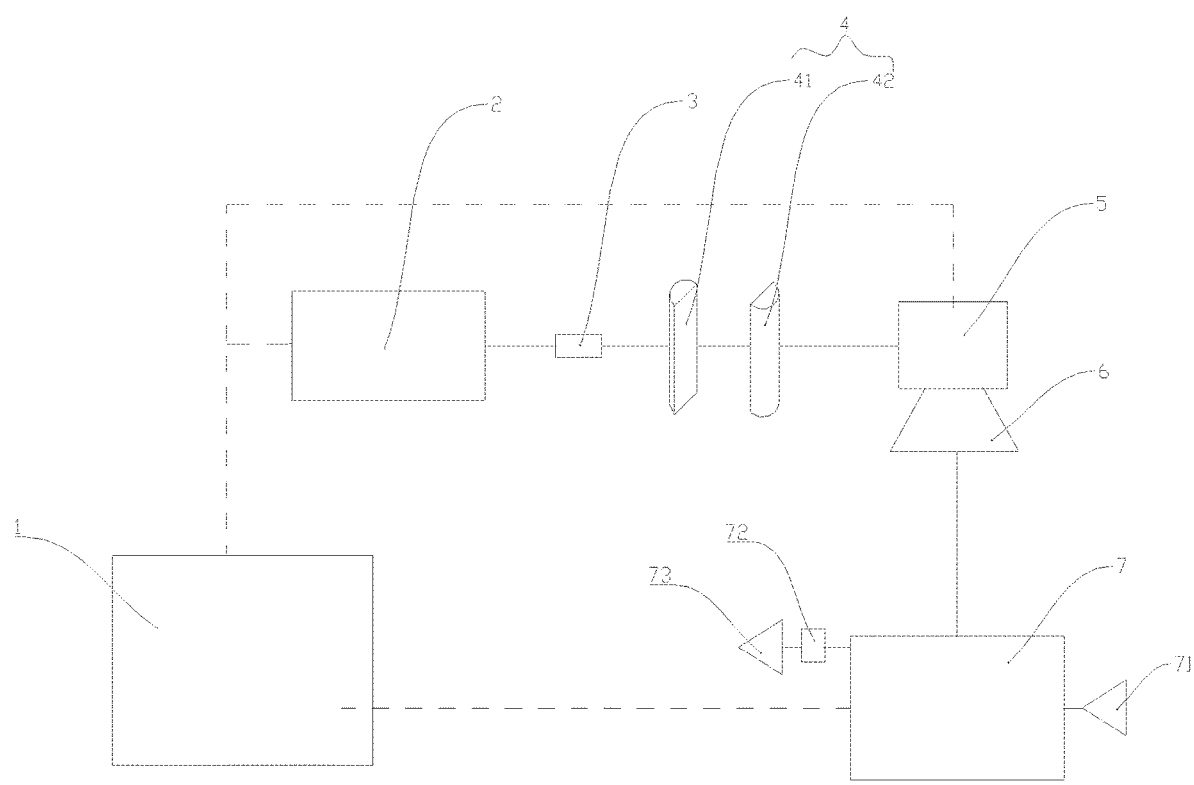
FIG. 1 is a functional block diagram of a first embodiment of a laser 3D printing system with orthopedic function of the present application.
Figure 2:
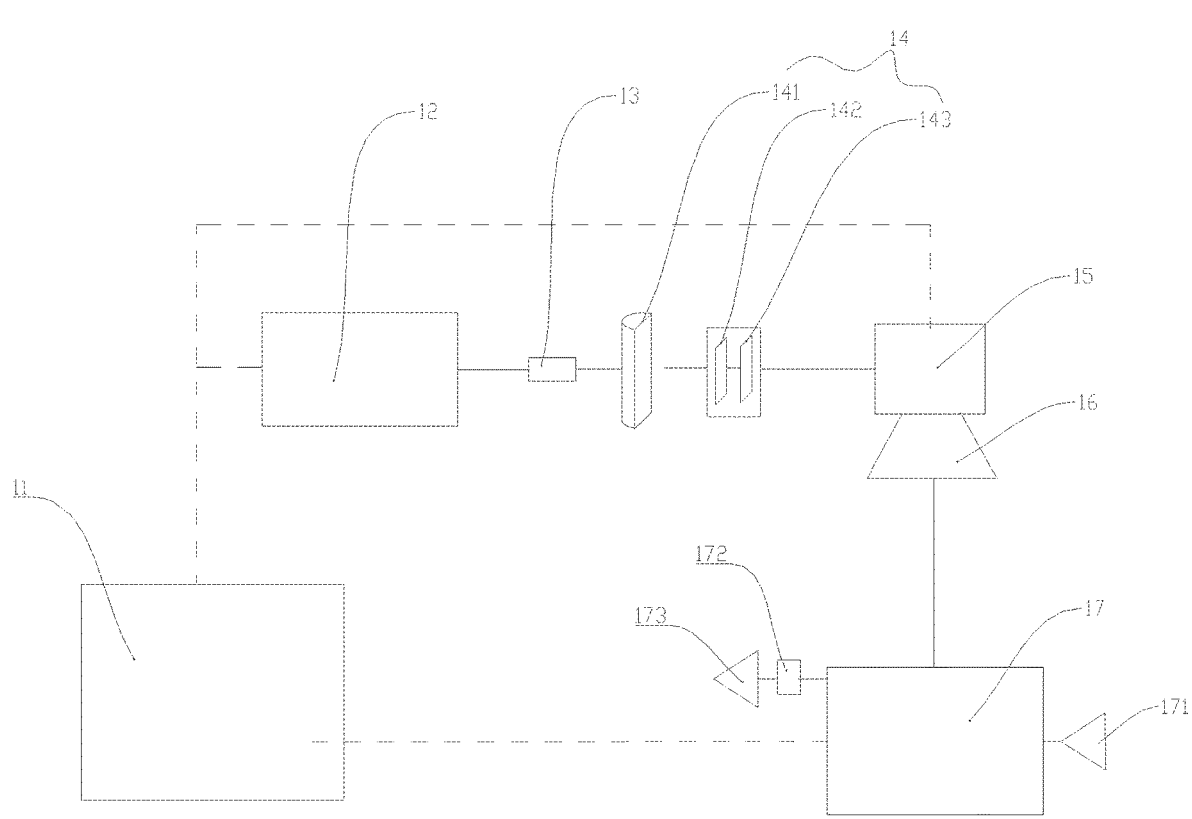
FIG. 2 is a functional block diagram of a second embodiment of a laser 3D printing system with orthopedic function of the present application.

Referring to FIG. 1, in the embodiments, referring to FIG. 1 and FIG. 2, a laser 3D printing system with orthopedic function of the present embodiment mainly comprises an industrial personal computer, a laser scanning device and a powder box. The industrial personal computer controls the laser scanning device to perform 3D printing to powder placed in the powder box, wherein the laser scanning device comprises a light spot orthopedic device for rectifying a laser beam.

Wherein, the industrial personal computer is connected to the laser scanning device and the powder box, and controls the laser scanning device and the powder box, so as to perform 3D printing to the material in the powder box.

Referring again to FIG. 1, in a first embodiment:

The laser scanning device comprises: a laser 2 connected to an industrial computer 1 and for adjusting a pulse width of a laser beam emitted according to the control of the industrial computer 1, a beam expanding device 3 connected to the laser 2, a light spot orthopedic device 4 connected to the rear of the beam expanding device 3, and a vibrating mirror and lens assembly for performing a laser scanning to a powder box 7, and the vibrating mirror and lens assembly comprises a vibrating mirror 5 and a lens 6 disposed behind the vibrating mirror 5, and the laser beam passing through the lens 6 acts on the powder box 7.

In the first embodiment, the light spot orthopedic device 4 comprises a pair of cylindrical lenses 41 and 42 which could rotate and shift relative to each other.

Wherein, the powder box 7 is further connected to a powder supply device 71.

Wherein, the laser 3D printing system further comprises: a powder cleaning device 72 connected to the powder box 7 and a powder collecting device 73 connected to the powder cleaning device 72, and the powder cleaning device 72 and the powder collecting device 73 are used for cleaning and collecting the powder after 3D printing.

Wherein, the working principle of the light spot orthopedic device 4 is as follows: usually, after the laser beam passes through the laser scanning device, the size of the light spot within the focusing plane (scanning plane) is inconsistent, for example, the light spot will be stretched in a certain direction to form an elliptical light spot. The light spot orthopedic device could make a reverse compensation for each point within the focusing plane so that the size of the light spot within the focusing plane is consistent. For example, when the focused light spot is an elliptical light spot due to a certain spot in the large format being stretched in a x direction (in fact, the projection characteristics of each spot in the scanning plane are known in advance), by controlling the orthopedic device (relative rotation and/or shift), the laser beam irradiate to the vibrating mirror and lens assembly is stretched in a y direction, that's, reverse compensation, thereby ensuring that the focused light spot in the large format is always circular. By precisely controlling the compensation quantity of the orthopedic device, the embodiment could ensure that the size of the focused light spot is consistent.

Referring again to FIG. 2, in a second embodiment:

The laser scanning device comprises: a laser 12 connected to an industrial computer 11 and for adjusting a pulse width of a laser beam emitted according to the control of the industrial computer 11, a beam expanding device 13 connected to the laser 12, a light spot orthopedic device 14 connected to the rear of the beam expanding device 13, and a vibrating mirror and lens assembly for performing a laser scanning to a powder box 17, and the vibrating mirror and lens assembly comprises a vibrating mirror 15 and a lens 16 disposed behind the vibrating mirror 15, and the laser beam passing through the lens 16 acts on the powder box 17.

In the second embodiment, the light spot orthopedic device 14 comprises a cylindrical lens 141 and an imaging system located behind the cylindrical lens 141, and the cylindrical lens 141 could rotate and shift relative to the imaging system. The imaging system comprises a pair of lenses 142 and 143 which could shift relative to each other.

Wherein, the powder box 17 is further connected to a powder supply device 171.

Wherein, the laser 3D printing system further comprises: a powder cleaning device 172 connected to the powder box 17 and a powder collecting device 173 connected to the powder cleaning device 172, and the powder cleaning device 172 and the powder collecting device 173 are used for cleaning and collecting the powder after 3D printing.

The working principle of the light spot orthopedic device 14 is the same as the working principle of the light spot orthopedic device 4 described above, and will not be described herein.

Figure 3:
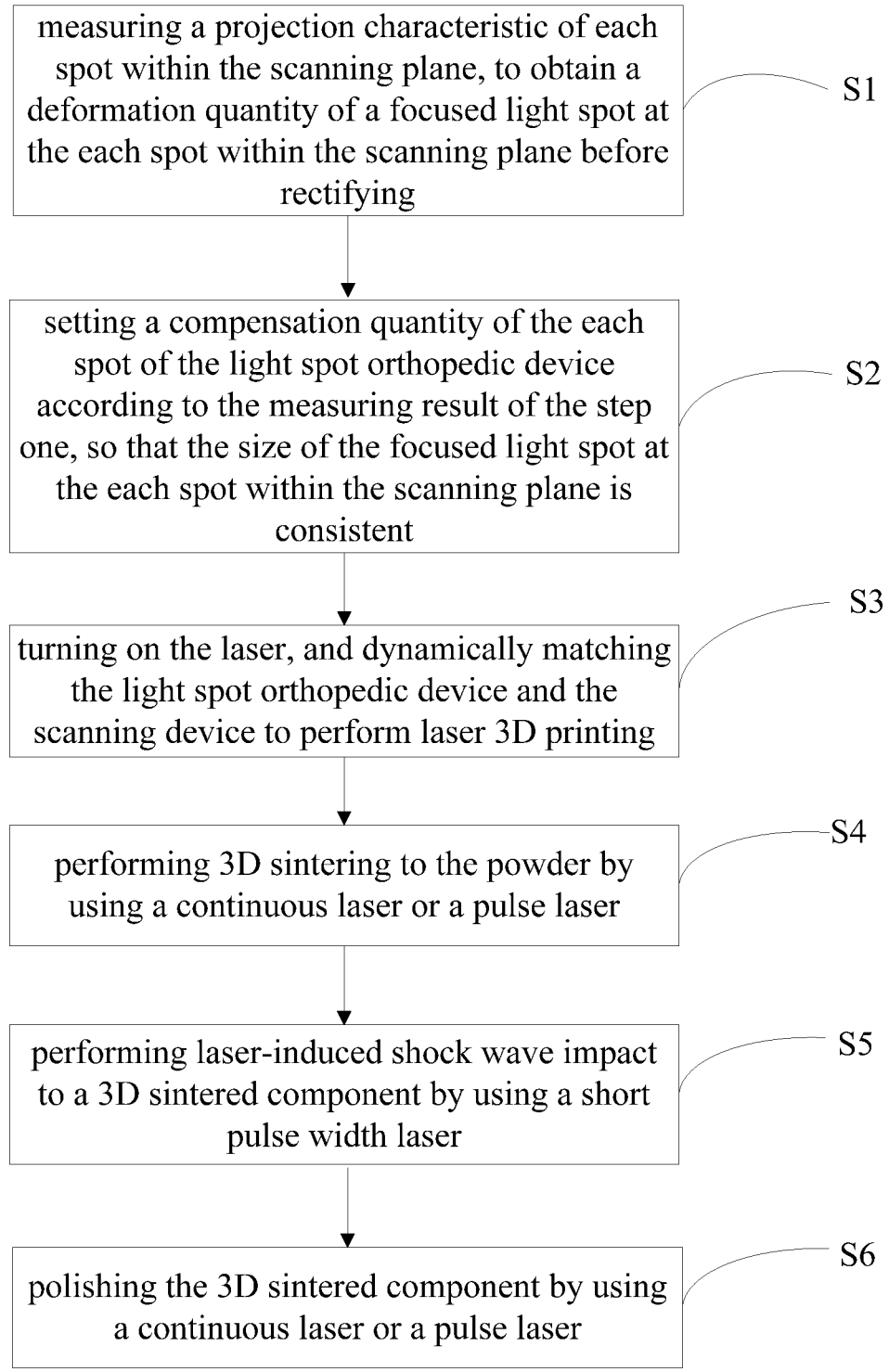
FIG. 3 is a flow chart of a 3D printing method using a laser 3D printing system with orthopedic function of the present application.

Referring to FIG. 3, the embodiment of the present application further discloses a 3D printing method using the laser 3D printing system with orthopedic function described above, and the method comprises the following steps:

Step one S1, measuring a projection characteristic of each spot within the scanning plane, to obtain a deformation quantity of a focused light spot at the each spot within the scanning plane before rectifying;

Step two S2, setting a compensation quantity of the each spot within the scanning plane of the light spot orthopedic device according to the measuring result of the step one, so that the size of the focused light spot at the each spot within the scanning plane is consistent;

Step three S3, turning on the laser, and dynamically matching the light spot orthopedic device and the scanning device to perform laser 3D printing.

Further, after the step three S3, the method further comprises:

Step four S4, performing 3D sintering to the powder by using a continuous laser or a pulse laser;

Step five S5, performing laser-induced shock wave impact to a 3D sintered component by using a short pulse width (<100 ns) laser;

Step six S6, polishing the 3D sintered component obtained after the step five by using a continuous laser or a pulse laser.

Besides, when the 3D printing involves powders of various materials, such as using different materials (powders) in adjacent layers, or using different materials (powders) in different positions of the same layer, select a suitable laser wavelength, pulse energy and pulse width according to the optical characteristics of each material (powder) to be used in the above method, to realize a printing, impact and polishing of functionally graded materials.

The 3D printing system for a workpiece of the present application adjusts the pulse width of the laser beam to change the energy absorbed by the powder, thereby changing the melting quality of the powder particles, thereby reducing the viscosity and surface tension of the melt, and increasing the depth and width of the molten pool, so as to increase adhesion between the particles, thereby increasing the density of the workpiece. The 3D printing system comprises the orthopedic device, so that the 3D printing system could ensure that the size of the focused spot is consistent within the scanning plane, thereby ensuring the quality of the 3D printing.

The above description is only the preferred embodiments of the present application, and is not intended to limit the embodiments of the present application. Persons skilled in the art could easily make corresponding alternatives and modifications according to the main idea and spirit of the present application. The protection scope of the present application should be subject to the protection scope claimed in the claims.

What is claimed is:

1. A system for implementing a laser 3D printing method with orthopedic function comprising the following steps:

step one, measuring a projection characteristic of each spot within a scanning plane, to obtain a deformation quantity of a focused light spot at the each spot within the scanning plane before rectifying;

step two, setting compensation quantities of the each spot within the scanning plane of a light spot orthopedic device according to the measuring result of the step one, so that the size of the focused light spot at the each spot within the scanning plane is consistent;

step three, turning on the laser, and dynamically matching the light spot orthopedic device and a scanning device to perform the laser 3D printing;

the system comprising: an industrial personal computer; a laser having an adjustable pulse width and connected to and controlled by the industrial personal computer, a beam expanding device, a light spot orthodontic device, and a vibrating mirror and lens assembly;

and a powder box connected to and controlled by the industrial personal computer and receiving a scan of the vibrating mirror and lens assembly for 3D printing of a workpiece;

wherein the light spot orthodontic device comprises a cylindrical lens and an imaging system located behind the cylindrical lens, and the cylindrical lens could rotate and shift relative to the imaging system; and the imaging system comprises a pair of lenses.

2. The system according to claim 1, after the step three, the method further comprises:

step four, performing 3D sintering to powder by using a continuous laser or a pulse laser;

step five, performing laser-induced shock wave impact to a 3D sintered component by using a short pulse width laser; wherein the short pulse width refers to a pulse width of less than 100 ns;

step six, polishing the 3D sintered component obtained after the step five by using a continuous laser or a pulse laser.

3. The system according to claim 1, wherein the light spot orthodontic device comprises a pair of cylindrical lenses which could rotate and shift relative to each other.

4. The system according to claim 1, wherein the powder box is further connected to a powder supply device.

5. The system according to claim 4, wherein the system further comprises a powder cleaning device connected to the powder box and a powder collecting device connected to the powder cleaning device.

* * * * *